UNITED STATES PATENT OFFICE.

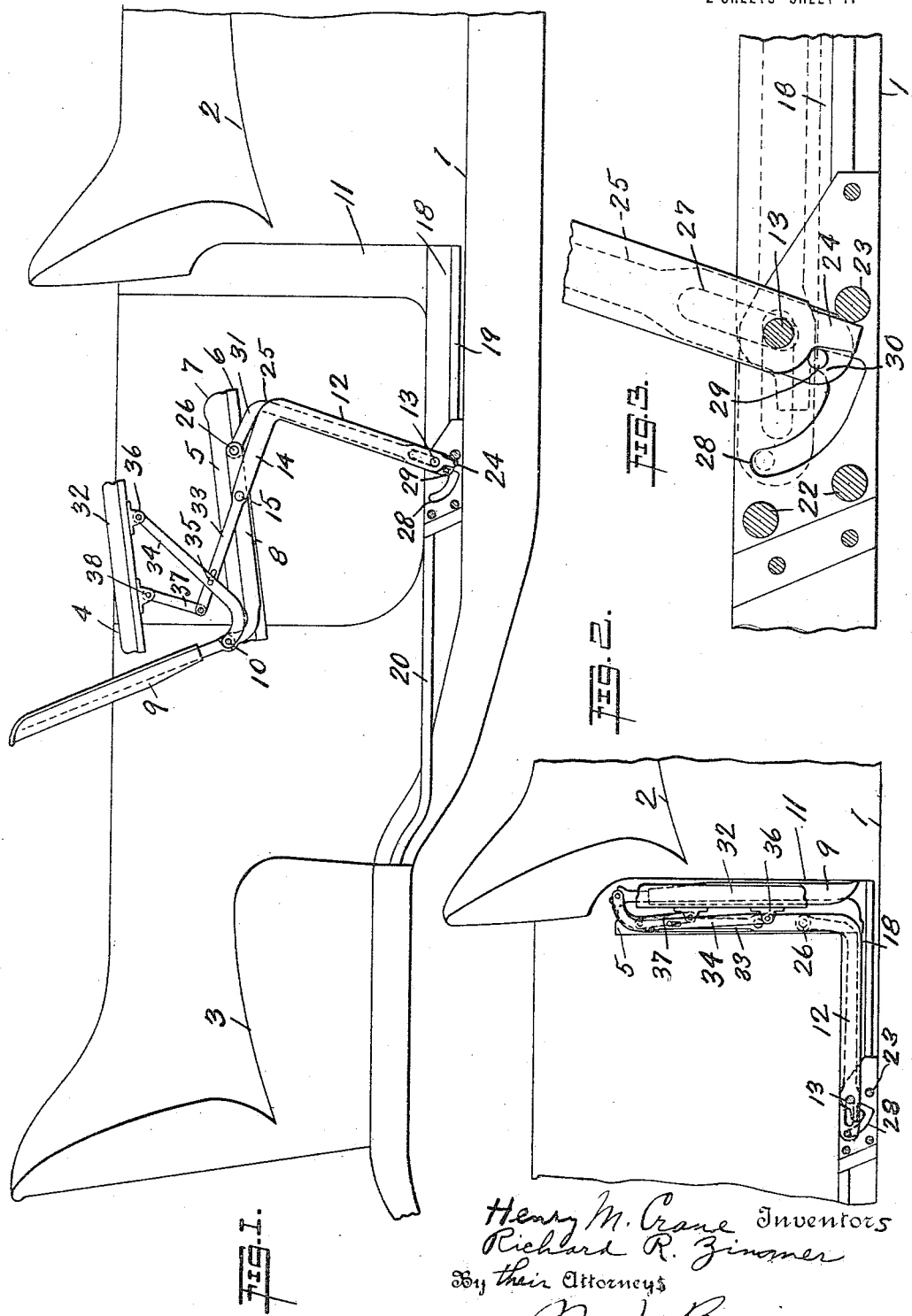

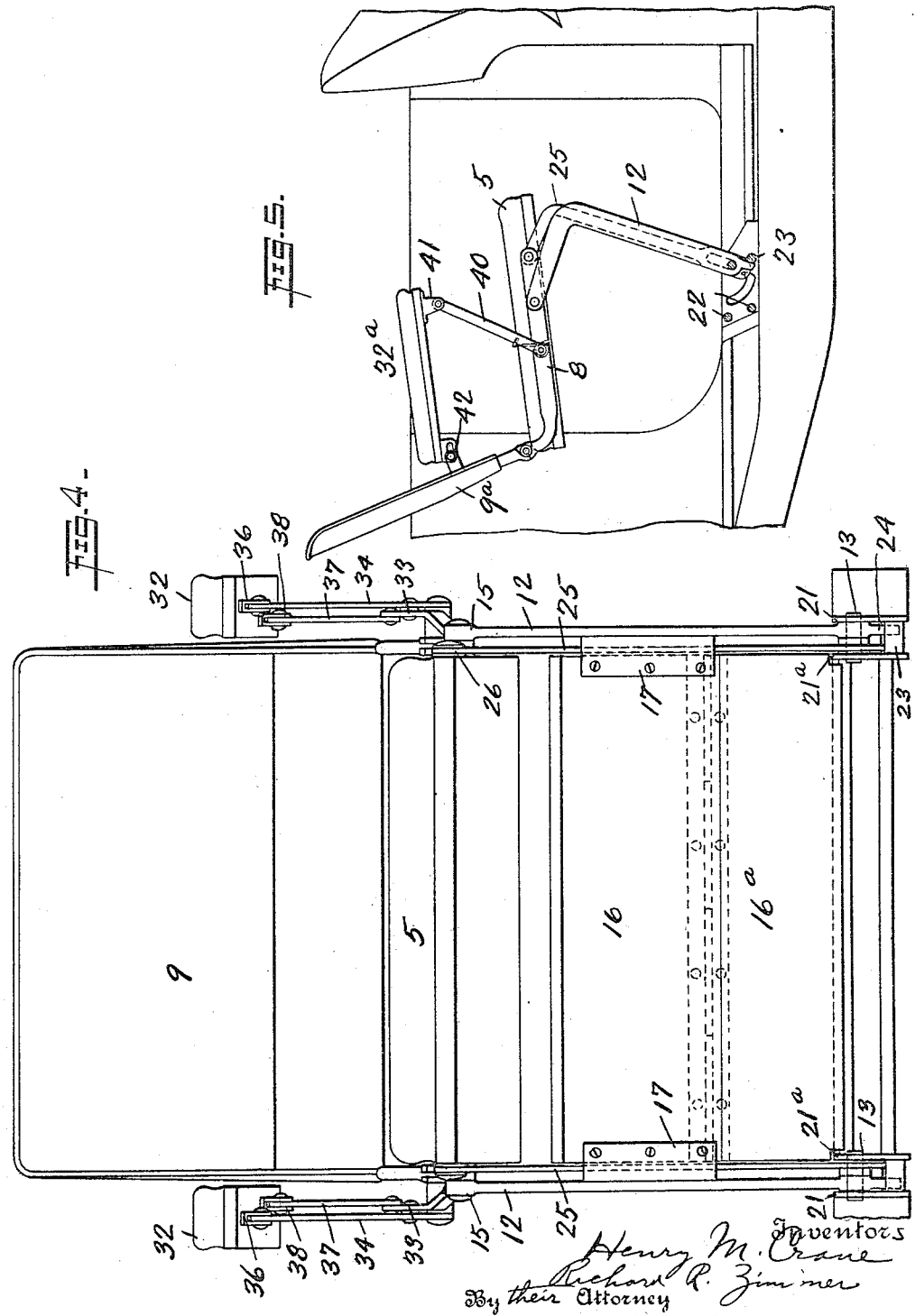

HENRY M. CRANE, OF NEW YORK, N. Y., AND RICHARD R. ZIMMER, OF NEW BRUNSWICK, NEW JERSEY, ASSIGNORS TO SIMPLEX AUTOMOBILE COMPANY, INC., OF NEW BRUNSWICK, NEW JERSEY, A CORPORATION OF DELAWARE.

AUTOMOBILE-SEAT.

1,245,195.

Specification of Letters Patent.

Patented Nov. 6, 1917.

Application filed July 12, 1916. Serial No. 108,881.

*To all whom it may concern:*

Be it known that we, HENRY M. CRANE, a citizen of the United States, residing in the borough of Manhattan, city, county, and State of New York, and RICHARD R. ZIMMER, a citizen of the United States, residing in city of New Brunswick, Middlesex county, New Jersey, have invented certain new and useful Improvements in Automobile-Seats, of which the following is a specification.

Our invention relates to folding automobile seats of the type which are used to afford extra seating capacity between the fixed front and rear seats, such seats being mounted upon pivoted frames so as to swing forward and downward into recesses in the floor and in the back of the front seats. In order to permit folding of the seats, their main supporting pivots have had to be spaced rearward from the front seats at a distance approximately equal to the height of the seats from the floor, with the result that either the seats will be too low for comfort or else they will be too far from the front seats and too near the rear seats. The present invention involves a frame which comprises a leg portion and a rearward extending upper portion substantially at right angles to each other, and which in the normal or erected condition is tilted forward from its main supporting pivots, so as to give the desired amount of space at the back; the seat member, however, is not also tilted forward, but is pivoted to the rearward extension of the frame and in angular relation thereto, and means are provided for changing this angular relation when the seat is folded, so that the seat member is then brought approximately into parallelism with the upper, normally rearward extending portion of the frame, both of these parts then being substantially vertical so as to occupy the least space behind the front seats. This construction not only permits of a relatively high seat (measured from the floor boards,) while leaving ample space in the rear, but also makes it possible for the manufacturer to select any desired angle or rearward dip for the seat member in the normal position without causing the seat when folded to obstruct the entrance into the car. A further feature of the invention comprises a foldable arm rest, which is folded or raised by the relative movement between the seat member and either the frame or the back member, which latter is hinged to the seat member. This back, it may be noted, may be made comparatively high and may be placed at any angle desired by the manufacturer, both important considerations from the standpoint of comfort, without exceeding the limitations of the design.

In the accompanying drawings illustrating two of the possible embodiments of the invention:

Figure 1 is a side elevation of the folding seat shown in relation to an automobile body, which is represented in a somewhat diagrammatic manner;

Fig. 2 is a view of the seat folded down into the recesses in the floor and back seat;

Fig. 3 is an enlarged fragmentary side elevation of the L frame and tension linkage and their mounting in the floor of the car, the erect and folded positions being represented by full and dotted lines, respectively;

Fig. 4 is a front elevation of the seat; and

Fig. 5 is a side elevation of a seat having an alternative construction for the folding arm rests.

The drawings indicate the body 1 of an automobile having front and rear seats 2 and 3. The intermediate seats, of which one is shown, are designated generally 4. The seat member 5 of the folding seat is preferably made of a suitable wood frame 6 carrying upholstery 7 and having metal bracket plates 8 fixed to its opposite sides. The back member 9 is hinged at 10 to the upward extended rear ends of these plates, in such manner as to be capable of folding flat upon the seat member.

The means for supporting the seat member from the base support and for enabling the seat and back members to be folded in substantially vertical positions into the recess 11 in the back of the front seats comprises a pair of inverted angular or L supporting members or levers 12, the lower ends of which are hinged to the base support upon pivots 13, and the upper normally rearward extending portions 14 of which are pivoted at 15 to the bracket plates 8 intermediate the front and back of the seat member. By means of these supporting members pivoted intermediate of the front and back of the seat, back legs for the seat are done away with and more leg room and comfort is provided for an occupant of the rear seat. The members 12 are preferably tied together, and the space between them closed by means of one or more boards 16 and 16ª, of which the board 16 may be united to flanges 17 on the leg portions of the L members, while the board 16ª may be hinged to the upper board 16 to permit the portion of the space nearest the pivots 13 to be opened if desired. In the folded state the leg portions of the L members 12 with the boards 16 and 16ª are received in a recess 18 in the floor, in which condition the said boards constitute floor boards overlying the fixed dropped floor boards 19 and substantially at a level with the rear floor boards 20.

The base support includes a pair of fixed bracket plates 21 and 21ª, secured in the floor of the car at opposite sides of the lower portion of each of the L members 12 and held at a fixed distance from each other by pins 22, 23. These plates carry the main pivots 13, and their pins 23 constitute limit stops positioned to be contacted by extensions 24 on the lower ends of the leg portions of the L members when these members in the operation of being raised from folded condition reach the forward tilted position of Fig. 1, in which condition the leg portions incline downward and rearward to the main pivots 13 while the upper portions 14 incline upward and rearward to the pivots 15, whereon the seat member is fulcrumed. The use of a folding L support, which is normally tilted in this manner, is important, since it becomes possible so to design the parts as to secure a higher seat, which can be positioned sufficiently far forward to leave ample room in the rear and yet fold compactly into the spaces provided for this purpose.

In the condition of use the seat member 5 is not parallel with the portions 14 of the L members, nor is it preferably horizontal as heretofore, it being a further advantage of our invention that it becomes possible to give the seat member any degree of rearward dip which may be desired for comfort of the occupants. In order to permit the seat to fold properly into the recess 11, however, in such manner as not to obstruct the entrance into the car, it is necessary to provide means for changing or diminishing the angular relation between the seat member 5 and the portions 14 of the L members so that when folded these parts are substantially parallel, that is to say both substantially vertical. The provision of means whereby such change in angular relation may be effected, therefore, constitutes an important feature of our invention, and, while the specific embodiment thereof may be widely varied, we prefer to employ tension links, such as the links 25, the upper ends of which are pivoted at 26 to the forward ends of the seat member bracket plates 8. These links normally coöperate with the L members 12 to sustain the seat member 5 in the open condition and at the desired angle of rearward dip, and their mounting is such that, when the seat is folded, they either permit the seat member 5 to be brought into substantial parallelism with the L member portions 14 or actually exert force upon the seat member to effect this result, the latter action being preferred. One mode of securing this result consists in providing the lower ends of the links 25 with longitudinal slots 27, whereby they have a sliding and pivotal mounting on the main pivots 13, and by forming additional curved cam slots 28 in the floor plates 21, 21ª coöperating with pins 29 projecting laterally from the links below the said main pivots. Locking means are preferably provided at the forward ends of the curved ways 28 to prevent swinging movement of the links 25 and thus to prevent the folding of the seat until the seat is unlocked by lifting upward upon the rear end of the seat member. To this end the ways 28 are shown communicating with notches or upward extending offsets 30, wherein the pins 29 are seated in the open condition. It may be noted that the slots 27 in the links are preferably of such length that their lower ends do not contact with the main pivots 13, the pull of the links being applied to the base support through the pins 29 bearing against the tops of these notches. When the seat is folded the pins 29 after being disengaged from these notches ride along in the cam slots 28, which are so formed that their upper edges progressively draw the pins 29 farther away from the pivots 13, so that the links 25 are pulled endwise relatively to the L members 12, thereby rocking the seat member 5 about the fulcrum 15 to produce the substantially parallel relation between the seat member and the portions 14 which is characteristic of the folded condition. It will be observed that the construction which has been described has the desirable feature that the major portions of the links 25 lie substantially in the same plane as the leg portions of the L members 12. The upper portions 31 of the links are preferably also bent rearward at approximately a right angle to their main portions, this being for the purpose of bringing the pivots 26 comparatively close to the pivots 15 so as to secure the desired extent of rocking movement of the seat member about the fulcrum 15 when the seat is folded without requiring an undue amount of endwise movement of the links 25 or an unfavorable formation of the cam ways 28.

The seat is equipped with folding arm rests 32; and in the form of the invention shown in Figs. 1, 2 and 4 means are provided whereby these arm rests are operated automatically by the relative angular movement between the seat member 5 and the L supports 12. The mechanism for effecting this operation may naturally be varied, but we prefer to extend the portions 14 of the L members as shown at 33 and to connect these extensions with the arm rests by means of levers 34, which are normally in diagonally crossing relation to the extensions 33, to which they are connected intermediately by means of a pin and slot 35, their upper ends being pivoted at 36 to brackets secured beneath the forward portions of the arm rests and their lower ends being pivoted upon the pintles of the back hinges 10. The extensions 33 are further connected with the arm rests by links 37, the lower ends of which are pivoted to the rear ends of the extensions and their upper ends being connected by pivots 38 with the arm rest brackets in rear of the pivots 36.

In the normal or erected condition of the seat, it will be understood that the seat member is supported rigidly by the coöperation of the L members 12 and the tension members or links 25, the said L members being braced against the stops 23 and the tension links pulling with their pins 29 against the upper ends of the notches 30. When the seat is to be folded, the back 9 is first swung down upon the seat member, the seat member is then lifted slightly at the rear in order to lower the pins 29 out of the notches 30, whereupon the whole structure is pushed forward, causing the pins 29 to ride upon the cam ways 28. After a certain point has been passed, the weight of the seat effects the remainder of the movement; and the pins 29, continuing to travel upon the ways 28, pull the links 25 endwise, so that when folded position is reached the seat member and the portions 14 are substantially parallel and vertical. This relative angular movement between the seat member and the L support also causes a lowering of the arm rests 32 alongside of the seat member, this movement being produced by the downward pressure of the extensions 33 upon the levers 34 intermediate the ends of the latter, and also by the pull which the said extensions exert upon the links 37, the result being that the arm rests descend into the plane of the seat member by what is approximately a parallel motion.

Fig. 5 illustrates a modification of the invention in so far as the folding of the arm rests is concerned. In this construction the arm rests 32ª have their forward portions connected with the seat member by links 40, which are pivoted at their upper ends to brackets 41 and at their lower ends to the bracket plates 8 of the seat member. The rear portions of the arm rests are connected with the back member 9ª by a slotted pivotal connection 42. When the back is swung downward upon the seat member the arm rests 32ª are pushed forward and lowered, this movement being permitted by the swinging of the link 40, and when the back is raised the reverse of this operation is effected, with the result that the arm rests are lifted to the desired elevation.

What we claim as new is:

1. In a folding automobile seat of the type described, the combination of a seat member, a supporting frame therefor, comprising a leg portion pivotally supported at the bottom and a rearwardly extending upper portion pivoted rearwardly of the leg portion to the seat member intermediate the front and back thereof, said frame standing normally at an inclination with its leg portion sloping downward and rearward to its pivotal support and its upper portion at an angle to the seat member and being adapted to swing forward and downward to folded position in which its leg portion is substantially horizontal and its upper portion substantially vertical, and means whereby the angular relation between the said upper portion and the seat member is changed in the folded condition so that the seat member is then also substantially vertical.

2. In a folding automobile seat of the character described, the combination of a seat member, a supporting frame comprising a leg portion pivotally supported at the bottom and a normally rearward extending upper portion pivoted rearwardly of the leg portion to the seat member intermediate the front and back thereof, said portion and the seat member being normally in angular relation to each other and the whole structure being adapted to swing forward and downward to fold, the said upper portion then projecting upward from the recumbent leg portion, and means whereby the seat member is brought substantially into parallelism with said upper portion of the frame in the folded condition.

3. In a folding automobile seat of the character described, the combination with a suitable base support, of a pair of supporting members comprising leg portions and upper portions normally extending rearward at right angles to the leg portions, said members being pivotally mounted on the bottom support so as to swing forward and downward to folded position, in which position the leg portions of the members are approximately horizontal and the upper portions, which normally extend rearward, are substantially erect, a seat member normally in angular relation to said supporting members and fulcrumed intermediate its front and back on the upper portions thereof, and means comprising links connecting the forward part of the seat member with the base support and adapted to exert a downward pull upon the forward part of the seat member and thereby cause the same to approach parallelism with the upper portions of the supporting members while the said members are being swung to folded position.

4. In a folding automobile seat of the character described, the combination with a suitable base support, of an inverted L supporting frame normally standing thereon at an inclination and comprising a leg portion and an upper portion normally extending rearward at right angles to the leg portion, said frame being capable of swinging forward and downward to folded position, in which position its leg portion is substantially horizontal and its upper, normally rearward projecting portion substantially erect, a seat member fulcrumed intermediate its front and back on the upper portion of said supporting frame rearwardly of the leg portion thereof, and additional supporting means connected with and normally in tension between the bottom support and the forward part of the seat member and movable endwise enabling the seat member also to be disposed substantially erect in the folded condition.

5. In a folding automobile seat of the character described, the combination with a suitable base support, of a swinging support constituting an inverted L in normal position and adapted to swing forward and downward to folded position in which its leg portion is recumbent and its upper portion generally erect, a seat member fulcrumed intermediate its front and back on the upper portion of said support rearwardly of the leg portion thereof and normally disposed at an inclination to the horizontal, and means comprising tension links connecting the forward part of the seat member with the base support to coöperate with said L support in sustaining the seat member at its normal inclination and whereby the seat member occupies a substantially erect position in the folded condition.

6. In a folding automobile seat of the character described, the combination with a suitable base support, of a pair of supporting members pivoted on the base support to swing forward and downward to folded position, said members comprising leg portions and upper normally rearward extending portions, a seat member fulcrumed intermediate its front and back on said upper portions of the members rearwardly of the leg portion thereof, tension links pivoted at their upper portions to the forward part of the seat member, and connections between the lower portions of said links and the base support whereby the links are capable of endwise and swinging movement.

7. In a folding automobile seat of the character described, the combination with a suitable base support, of a pair of supporting members pivoted on the base support to swing forward and downward to folded position, said members comprising leg portions and upper normally rearward extending portions, a seat member fulcrumed intermediate its front and back on said upper portions of the members, tension links pivoted at their upper portions to the forward part of the seat member, slotted pivotal connections between the lower portions of the links and the base support, and means for controlling said links in the folding operation comprising pins on the links and a curved way on the base support coöperating with said pins.

8. In a folding automobile seat of the character described, the combination of a seat member, supporting members therefor comprising leg portions and upper normally rearward extending portions, pivotal mountings for the leg portions of said supporting members whereby the same may swing forward and downward for folding, pivots connecting the upper, normally rearward extending portions of said members to the seat member intermediate the front and back of the latter, tension links lying in substantially the same plane as the leg portions of said links with the forward part of the seat member, and sliding and pivotal mountings for the lower portions of said links.

9. In a folding automobile seat of the character described, the combination of a seat member, supporting members therefor comprising leg portions and upper normally rearward extending portions, pivotal mountings for the lower portions of said supporting members whereby the same may swing forward and downward for folding, pivots connecting the upper, normally rearward extending portions of said members to the seat member intermediate the front and back of the latter, tension links pivoted to the forward part of the seat member and at their lower portions having longitudinal slots whereby they are guided on the main pivots of the members, pins on the lower portions of the links, and means affording curved slots wherein said pins travel when the seat is folded.

10. In a folding automobile seat of the character described, the combination of a seat member, supporting members therefor comprising leg portions and upper normally rearward extending portions, pivotal mountings for the lower portions of said supporting members whereby the same may swing forward and downward for folding, pivots connecting the upper, normally rearward extending portions of said members to the seat member intermediate the front and back of the latter, tension links having their major portions lying in substantially the same plane as the leg portions of the members and also having rearward extending upper portions which are pivoted to the seat member in advance of the aforementioned pivots, a sliding and pivotal mounting for the lower portions of said links, and means comprising pins on the lower portions of the links and members having curved ways coöperating with the pins for controlling the links as to endwise movement.

11. In a folding automobile seat of the character described, the combination of a seat member, a swinging, normally inverted L supporting frame whereon the seat member is fulcrumed intermediate its front and back, tension linkage pivoted at its upper portion to the forward part of the seat member, guiding means permitting endwise movement of the linkage, and cam means for controlling the linkage during the folding operation.

12. In a folding automobile seat of the character described, the combination of a seat member, swinging, normally inverted L supporting members whereon the seat member is fulcrumed intermediate its front and back, tension links pivoted to the forward part of the seat members and having slotted pivotal mountings at their lower portions, pins on the said lower portions of the links, and means affording cam slots to coöperate with said pins so as to effect endwise movement of the links when the seat is folded.

13. In a folding automobile seat of the character described, the combination of a seat member, swinging, normally inverted L supporting members whereon the seat member is fulcrumed intermediate its front and back, tension links pivoted to the forward part of the seat members and having slotted pivotal mountings at their lower portions, pins on the said lower portions of the links, members having curved ways to coöperate with said pins in the folding operation, and means for locking the links in their normal positions against movement along the ways.

14. In a folding automobile seat of the character described, the combination of a seat member, swinging, normally inverted L supporting members whereon the seat member is fulcrumed intermediate its front and back, tension links pivoted to the forward part of the seat members and having slotted pivotal mountings at their lower portions, pins on the said lower portions of the links, and means affording cam ways with notches at their forward ends to coöperate with said pins.

15. In a folding automobile seat of the character described, a seat member, a back member hinged thereto so as to fold upon the seat member, and swinging inverted angular supporting members whereon the seat member is fulcrumed intermediate its front and back, thus doing away with back legs for the seat, providing more leg room and enabling the seat and back members to be swung downward to occupy substantially vertical positions, in combination with foldable arm rests, and means for operating said arm rests by relative angular movement between the seat member and the supporting means therefor.

16. In a folding automobile seat of the character described, a seat member, and means whereby the seat member is sustained in normal position and whereby it may be swung downward to a substantially vertical position, the said means comprising swinging inverted L supporting members on which the seat member is fulcrumed at a point intermediate the front and back of the seat member and rearward of the leg portions of the L members; and linkage connected with the seat member and a base to change the angular relation between the supporting members and the seat member when the seat is folded, in combination with foldable arm rests, and means comprising connections between said arm rests and said L supporting members to effect the lowering and raising of the arm rests.

17. In a folding automobile seat of the character described, a seat member and means whereby the seat member is sustained in normal position and whereby it may be swung downward to a substantially vertical position, the said means comprising swinging inverted L supporting members on which the seat member is fulcrumed, and linkage connected with the seat member and a base to change the angular relation between the supporting members and the seat member when the seat is folded, in combination with foldable arm rests, extensions on said L members, and linkage connecting the arm rests with said extensions and with the seat member whereby the arm rests are lowered and raised by relative angular movement of these parts.

18. In a folding automobile seat of the character described, a seat member and means whereby the seat member is sustained in normal position and whereby it may be swung downward to a substantially vertical position, the said means comprising swinging inverted L supporting members on which the seat member is fulcrumed, and linkage connected with the seat member and a base to change the angular relation between the supporting members and the seat member when the seat is folded, in combination with foldable arm rests, extensions on said L members, levers connecting the arm rests with the seat member and themselves intermediately connected with said extensions, and additional links between the extensions and the arm rests, substantially as described.

In testimony whereof, we have signed our names in the presence of two subscribing witnesses.

HENRY M. CRANE.
RICHARD R. ZIMMER.

Witnesses:
FREDERICK CHARARAY,
H. E. BARDWELL.

Copies of this patent may be obtained for five cents each, by addressing the "Commissioner of Patents, Washington, D. C."